F. C. BLANCHARD & E. B. CROCKER.
FRAME FOR GAGE MOVEMENTS.
APPLICATION FILED DEC. 30, 1907.
940,379.
Patented Nov. 16, 1909.
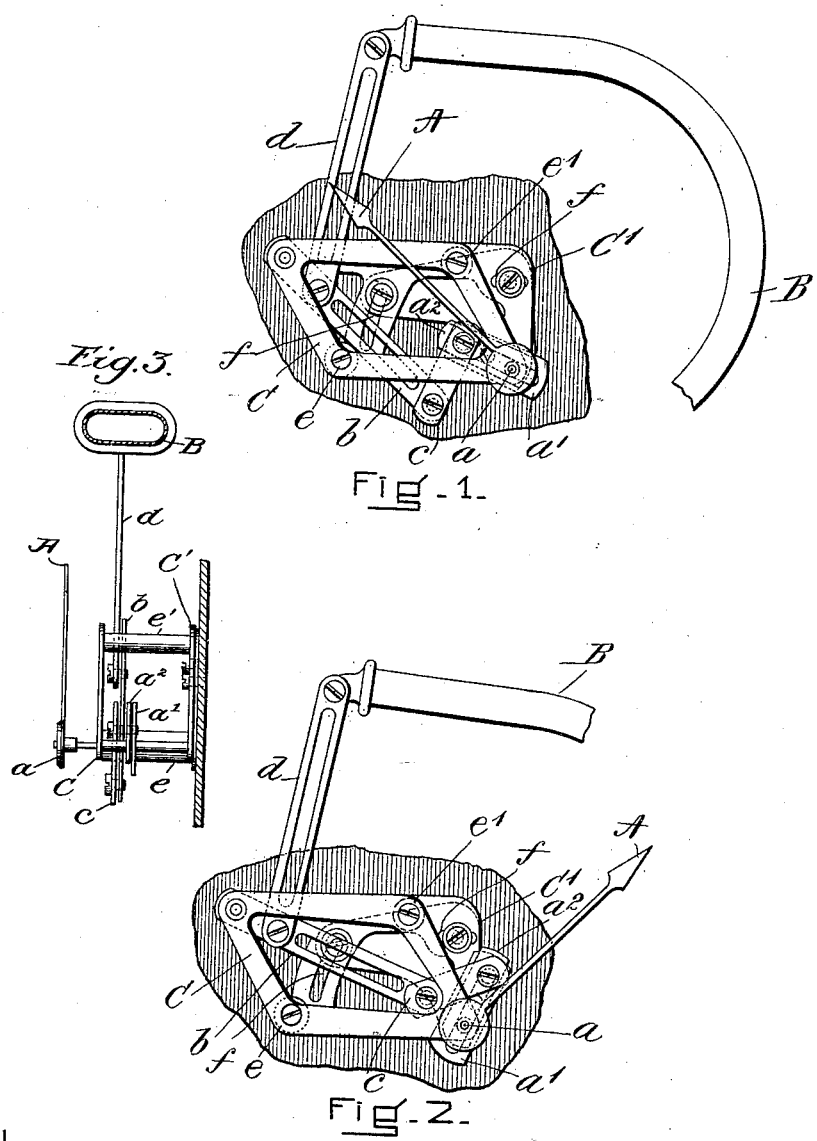

UNITED STATES PATENT OFFICE.

FREDERICK C. BLANCHARD AND ERNEST B. CROCKER, OF BRIDGEPORT, CONNECTICUT, ASSIGNORS TO THE ASHCROFT MANUFACTURING COMPANY, OF BRIDGEPORT, CONNECTICUT, A CORPORATION OF CONNECTICUT.

FRAME FOR GAGE-MOVEMENTS.

940,379. Specification of Letters Patent. Patented Nov. 16, 1909.

Application filed December 30, 1907. Serial No. 408,477.

*To all whom it may concern:*

Be it known that we, FREDERICK C. BLANCHARD and ERNEST B. CROCKER, citizens of the United States, and residents of Bridgeport, in the county of Fairfield and State of Connecticut, have invented new and useful Improvements in Frames for Gage-Movements, of which the following is a specification.

Our invention relates to pressure or vacuum gages and more particularly to the frame on which the gage movement is mounted.

In the older types of gages it is usual to secure the frame, upon which the gage movement is mounted, rigidly to the gage casing. This, together with the further fact that the tip of the Bourdon tube spring ordinarily used as the actuating member of a gage movement cannot in practice be brought always to the same location, has made it necessary to provide a special connecting link for each individual gage or a connecting member consisting of two slotted parts held together with screws thus entailing extra parts and complication.

One object of our invention is to provide a frame for the gage movement so constructed that the link for connecting the Bourdon tube spring and the gage movement may be made of uniform size, thus reducing the cost of manufacture and assembly of parts, and effecting a saving of time and trouble to users, to whom the connecting links can be furnished as spare parts.

Another object of our invention is to eliminate the stop pin from the gage dial. The stop pin which is commonly used upon the dial of pressure and vacuum gages is a fruitful source of trouble and annoyance, interfering seriously with the accuracy of the gage. After the gage has been carefully adjusted at the factory, the index hand is often bent or broken by contact with the stop pin in transportation and it not infrequently happens, owing to the rough handling incident to transportation, that the index hand jumps back over the stop pin and is thus prevented from rising when the gage is set up and pressure applied. Again, extreme movement or overtravel of the index hand causes it to press hard against the stop pin, resulting in bending of the hand and subsequent inaccuracy of the gage. And the same result often follows a sudden shutting off of pressure which causes the index hand to fall back suddenly and with considerable violence against the stop pin.

In our invention the necessity for a stop pin on the gage dial is eliminated by stops to limit the range of movement which are provided upon the frame upon which the gage movement is mounted.

Our invention is characterized by any convenient arrangement by which the frame-stops and gage movement are mutually and relatively adjustable so that the range of gage movement is prescribed by contact of some member of the gage movement with the stops.

In the description and drawings we have shown and described a gage movement of novel construction mounted upon our gage frame. (This gage movement is reserved for claim in an application filed by us concurrently herewith.) It is obvious, however, that our improved frame can be used with many different gage movements, as for example, the familiar segment and pinion type, and we do not desire therefore to limit ourselves to its use with the specific gage movement shown in these drawings and described in the specification.

In the drawings which illustrate an embodiment of the invention,—Figure 1 is a side elevation of the improved gage movement and frame in normal position; and Fig. 2 is a side elevation of the improved gage movement and frame showing the position of the index hand after pressure is applied, and Fig. 3 is an end elevation of the improved gage movement and frame.

Referring to Figs. 1 and 2, A is the index hand mounted upon the hand staff $a$ to which is secured the hand crank $a'$. $b$ is a motion-multiplying lever having an articulated connection by the link $c$ with the hand crank $a'$. $d$ is a link connecting the lever $b$ with the actuating member, shown in the drawing as a Bourdon tube spring B.

Our improved frame on which the movement is mounted consists of the plates C, C' with posts $e$, $e'$, between them, said posts being in the path of the lever $b$. $f$, $f$ are circumferential slots in the plate C' for securing the frame to its support, said slots being arranged around the hand staff axis $a$ as a center.

In securing the movement to its support, the link $d$ is first secured to the lever $b$ and then to the Bourdon tube spring B, or other actuating member; the frame is then swung upon the hand staff axis $a$ as a center and adjusted by means of the slots $f$, $f$ so that the lever $b$ rests on the post $e$ as shown in Fig. 1, when the index hand will be at zero. The frame is then secured to its support. This adjustability of the frame, with relation to the location of the tip of the Bourdon tube spring permits the connecting links $b$ to be made of uniform length. The posts $e$, $e'$ being located in the path of the lever $b$ limit its extreme upward and downward movement and the consequent extreme upward or downward movement of the index hand. In this way the necessity for a stop pin upon the gage dial is eliminated.

Because of the fact that in practice Bourdon tube springs, even in the same lot, vary somewhat in stiffness, it is essential in the calibration of gages to provide means whereby the travel of the hand on the dial may be adjusted to show the pressure to which the tube or spring is subjected. For this purpose an adjustment slide $a^2$ is mounted underneath the hand crank $a'$.

We claim:

1. In a gage, the combination with a support, and an actuating member, of a frame carried by said support, a gage hand and a hand actuating mechanical train mounted upon said frame, and connections between the frame and support whereby the former may be adjusted with relation to the latter, around the hand staff axis as a center.

2. In a gage, the combination with a support, and an actuating member, of a gage hand, a frame, a hand actuating mechanical train mounted in said frame and connected with said actuating member, said frame comprising stops to limit the gage movement, and connections between said frame and support whereby the former may be adjusted relative to the latter around the hand staff axis as a center.

3. In a gage, the combination with a support, and an actuating member, of a gage hand, a frame, a gage hand crank, a motion multiplying lever carried by said frame and connected with said actuating member, an articulated connection between said lever and said hand crank, said frame comprising stops to limit the gage movement, and connections between said frame and support whereby the former may be adjusted relative to the latter, around the hand staff axis as a center.

4. In a gage, the combination with a support, and an actuating member, of a gage hand, a gage hand crank, a frame, a motion multiplying lever carried by said frame and connected with said actuating member, an articulated connection between said lever and said hand crank, said frame comprising stops arranged in the path of said lever to limit the gage movement, and connections between said frame and support whereby the former may be adjusted relative to the latter, around the hand staff axis as a center.

5. In a gage, the combination with a support, and an actuating member, of a gage hand, a gage hand crank, a motion multiplying lever connected with said actuating member, an articulated connection between said lever and said hand crank, a frame in which said lever and hand crank are mounted, and comprising stops to limit the gage movement, and connections between said frame and support whereby the former may be adjusted relative to the latter, around the hand staff axis as a center.

6. In a gage, the combination with a support, and an actuating member, of a gage hand, a gage hand crank, a motion multiplying lever connected with said actuating member, an articulated connection between said lever and said hand crank, an adjustment slide mounted upon said hand crank, a frame in which said hand crank and lever are mounted, and comprising stops in the path of said lever to limit the gage movement, and connections between said frame and support whereby the former may be adjusted relative to the latter around the hand staff axis as a center.

7. In a gage, the combination of the actuating member, a gage hand, a gage hand crank, a motion multiplying lever, connection therefrom to the actuating member, and an articulated connection between said lever and said hand crank, an adjustment slide mounted upon said hand crank, a frame carrying said hand crank and lever, a support for said frame, said frame mounted upon said support and so constructed as to be adjustable with relation thereto around the hand staff axis as a center, and comprising stops to limit the gage movement and means to retain said frame in adjusted position.

8. In a gage, the combination of the actuating member, a gage hand, a gage hand crank, a motion multiplying lever, connection therefrom to the actuating member and an articulated connection between said lever and said hand crank, an adjustment slide mounted upon said hand crank, a frame carrying said hand crank and lever, a support for said frame, said frame mounted upon said support and so constructed as to be adjustable with relation thereto around
5 the hand staff axis as a center, and comprising stops in the path of said lever to limit the gage movement and means to retain said frame in adjusted position.

Signed by us at Bridgeport, Connecticut, this 26th day of December, 1907.

FREDERICK C. BLANCHARD.
ERNEST B. CROCKER.

Witnesses:
C. R. CLARKE,
H. P. GOODWIN.